(No Model.) 2 Sheets—Sheet 1.
C. E. EMERY.
MEANS FOR LUBRICATING BEARINGS OF STEAM ENGINES.
No. 540,383. Patented June 4, 1895.
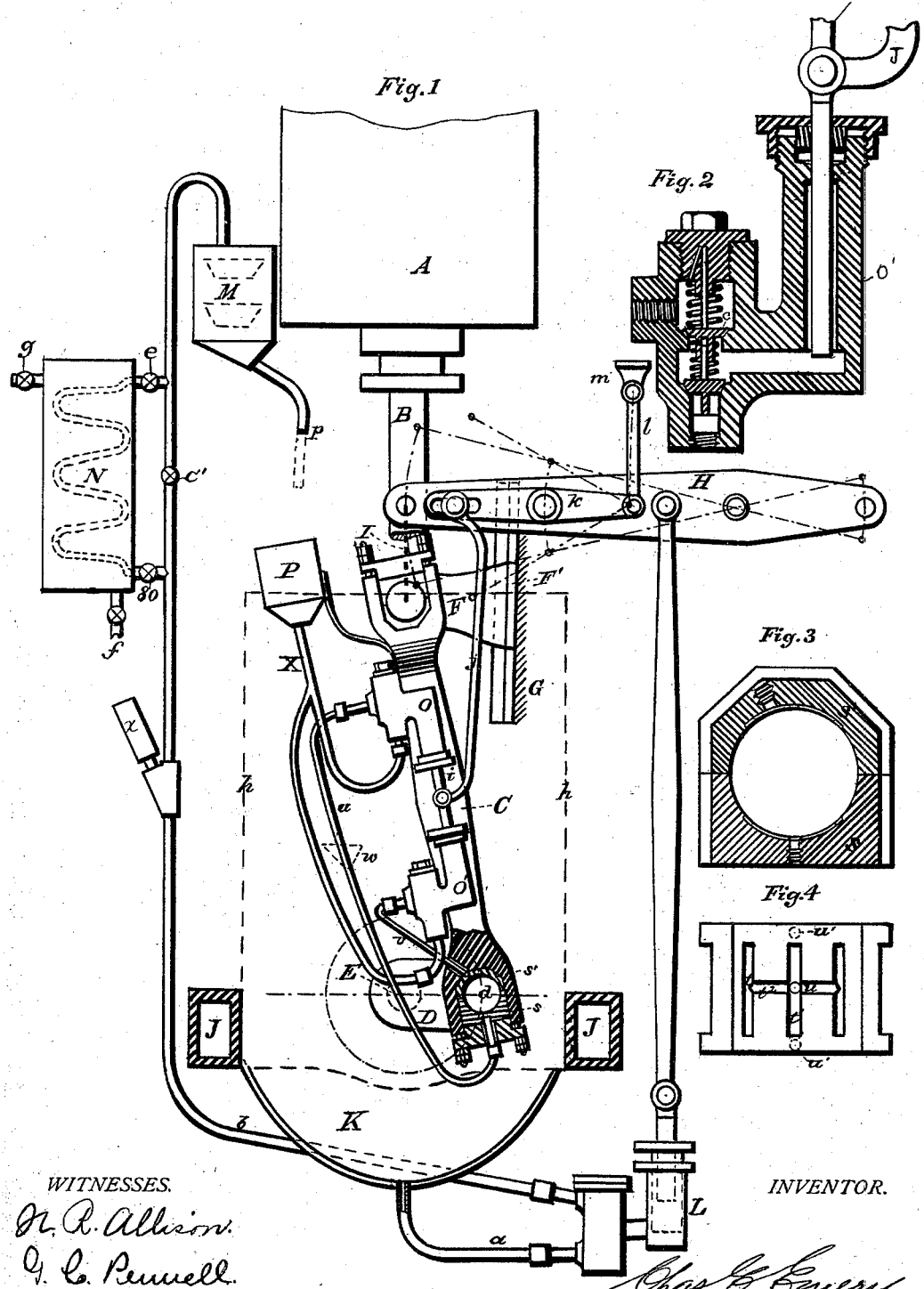
WITNESSES.
N. R. Allison.
G. C. Pennell.
INVENTOR.
Chas. E. Emery (No Model.) 2 Sheets—Sheet 2.
C. E. EMERY.
MEANS FOR LUBRICATING BEARINGS OF STEAM ENGINES.
No. 540,383. Patented June 4, 1895.
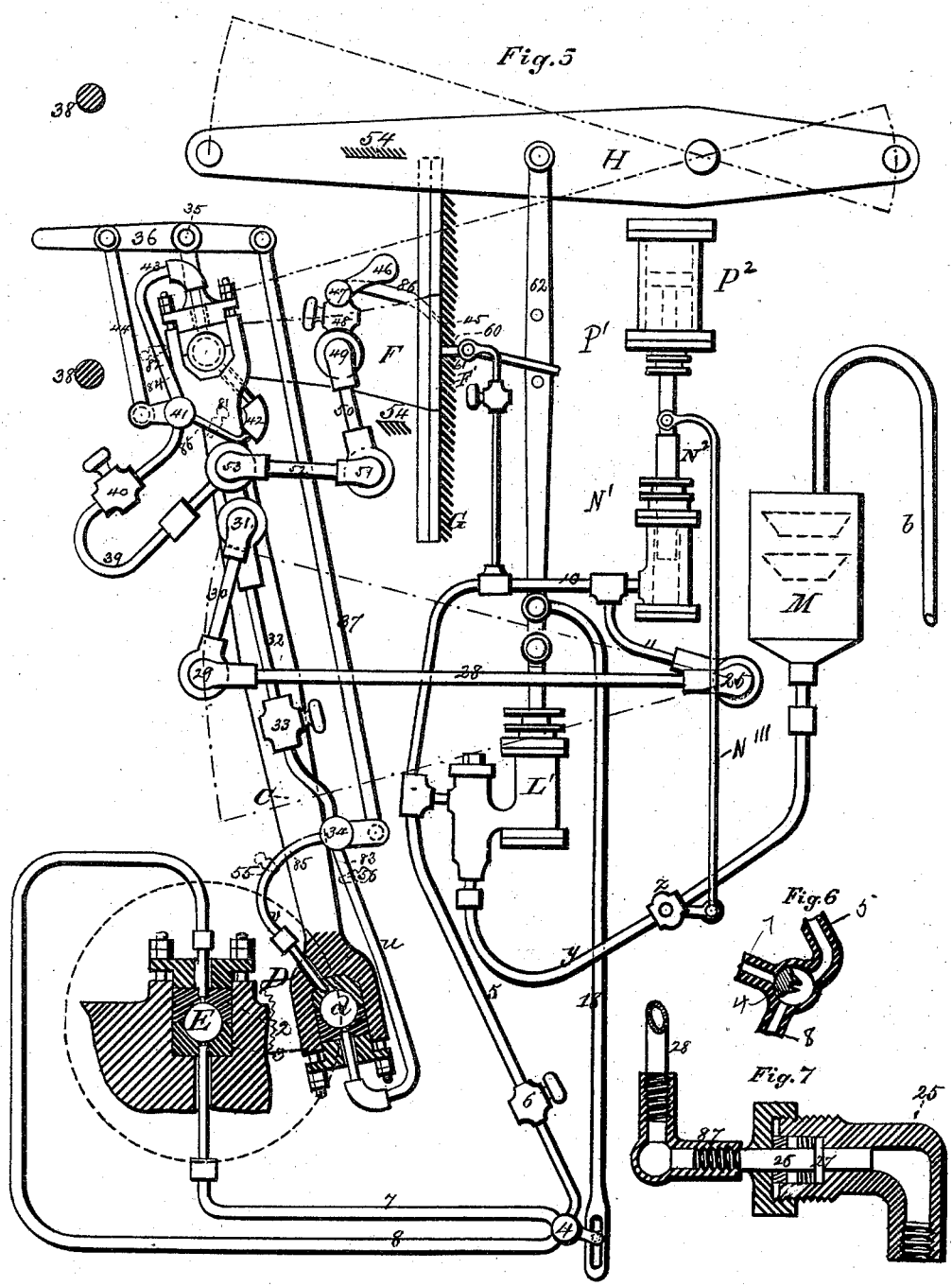
WITNESSES
N. R. Allison
G. C. Pennell
INVENTOR
Chas. E. Emery

UNITED STATES PATENT OFFICE.

CHARLES E. EMERY, OF BROOKLYN, NEW YORK.

MEANS FOR LUBRICATING BEARINGS OF STEAM-ENGINES.

SPECIFICATION forming part of Letters Patent No. 540,383, dated June 4, 1895.

Application filed November 18, 1889. Renewed October 5, 1892. Serial No. 447,869. (No model.)

*To all whom it may concern:*

Be it known that I, CHARLES E. EMERY, of Brooklyn, Kings county, New York, (office, New York city,) have made certain new and useful Improvements in Means for Lubricating the Bearings of Steam-Engines; and I do hereby declare that the following is a full, clear, and exact description thereof, reference being had to the accompanying drawings, making part of this specification.

In the ordinary operation of the bearings of steam engines and of other machinery, oil dropped upon or otherwise applied to the journal works its way between the moving surfaces of the same and the bearing brasses, thereby securing lubrication to a degree sufficient at moderate velocities and when the pressures are light, to prevent heating and undue wear, but with heavy pressures and high velocities the friction becomes so great that extreme care must be taken with the lubrication and in some cases water applied to keep the bearings cool.

The object of this invention is to improve the lubrication by introducing oil to the oil cavities in the bearing boxes under pressure so that it will more readily enter between the bearing surfaces and thereby improve the lubrication and reduce the friction; the perfection of lubrication being secured by introducing the oil at a pressure so high that it will slightly separate the bearing surfaces and issue continuously in a thin film between them, over which film the surfaces will glide with little friction more than the motion of the fluid particles over one another. The drawings refer to two forms of apparatus designed to accomplish this purpose; one applicable to the crank pin of a steam engine, in which oil pumps attached to the connecting rod are operated to force oil alternately into the oil grooves of the top and bottom bearing brasses of the crank pin; the other a more general plan in which elevated tanks or pumps located in any convenient position are arranged to supply oil under pressure to the various bearings of an engine.

The invention relates to means for producing the results above indicated, particularly in connection with bearings in which the direction of the pressure is reversed, as in those of a reciprocating steam engine.

In the drawings, Figure 1 represents a vertical side elevation of such of the principal details of a vertical steam-engine as are necessary to understand the operation of the first form of apparatus above referred to. Fig. 2 is a vertical section through the barrel and valve-chamber of a pump applicable for the uses herein referred to. Fig. 3 is a cross-section of a pair of journal bearing boxes or brasses. Fig. 4 is an inside view of the lower bearing-box *s*, shown in Fig. 3. Fig. 5 represents a vertical side elevation of such of the principal details of a vertical steam-engine as are necessary to understand the operation of the apparatus in the second or general form above mentioned. Fig. 6 is a cross-section through a valve used to distribute the oil under pressure, and Fig. 7 is a cross-section of a swing-joint for distributing oil under pressure. Figs. 1 and 5 are designed to exhibit the various details in one view. In practice such details would be disposed in such manner familiar to experts that the several moving parts would clear each other during the operation of the machinery and the pipes be arranged more compactly than it is possible to show them in an illustration for the present purpose.

In Fig. 1 A represents the steam cylinder; B, the main piston rod.

In Figs. 1 and 5, C represents the main connecting rod; D, the main crank and *d* the crank pin; E, the main shaft; F, the cross head carrying slide F'; G, the main guide; H, the air pump or other working beam which may be operated from the main cross head of the engine by connection I shown by a heavy dotted line, Fig. 1, and J, J, Fig. 1, represents a section of the frame of the engine. The foundation for the engine frame, the housings or connections between the frame and cylinder, the valve gear and many other details are omitted for clearness of illustration.

In either form of construction it is preferable to feed all the oil to the bearings which will pass between the moving surfaces and to prevent such oil from being wasted and enable it to be used over continuously it is proposed to provide drip pans under each bearing and to so screen and cover the same that the oil running off the bearings or thrown off therefrom by centrifugal force will be collected and run to a vessel at a low point, from which it can be pumped to an elevated position and after being cooled and strained be again used in the circulation.

As shown in Fig. 1, the crank D revolves between the two portions J, J, of the frame and in a crank pit K below the frames arranged to catch any oil that falls therein and from the bottom of this pit and similarly from any other that may be provided to catch oil, a pipe $a$ is led to the suction side of a pump L, preferably operated continuously by a connection to beam H or any other moving part of the engine, such pump delivering the oil through a pipe $b$, on opening a valve $c$ therein, directly into a series of pans containing filtering material in a filter M from which the oil passes to a suitable reservoir, which may be as shown in the bottom of the filter, and is from there distributed for lubricating purposes as hereinafter described. When the oil running from a journal is warm, it may if desired, by shutting cock $c'$ in pipe $b$ and opening branch cocks 80 and $e$, be circulated through the refrigerating coil N in a vessel around which is circulated salt water or any cooling mixture, the same as is now done in the surface condensers of steam vessels, and in fact the circulation about the coil N may frequently be made by connection to the circulating pumps of such surface condensers, water for instance entering the box at an inlet $f$ and being discharged overboard through an outlet $g$.

In Fig. 5 the drip pan and pump L for receiving oil are not shown but it is understood that some equivalent arrangement is to be provided as well as a cooling coil N when necessary. The filter M is shown in connection with that figure and the end of a pipe $b$ to discharge oil therein. In addition to the drip pans referred to, all necessary screens $h$, $h$, Fig. 1, would be put up about the engine to such height as required, so that any oil thrown off the moving machinery would be intercepted and conducted into the pans. These screens should be provided with doors and be removable as a whole.

In Fig. 1, O, O', represent oil pumps with a plunger $i$ extending from one to the other. These pumps are in this arrangement to be rigidly secured to the main connecting rod. The lower pump O', would be substantially like that shown in Fig. 2 or any ordinary pump, but the upper pump O is as shown inverted but with the valve chamber applied thereto so that the valves are vertical as in Fig. 2. The pump plunger $i$ is by connection $j$ operated by one end of a double lever $k$ pivoted to the working beam H and the inner end of such lever $k$ (nearest the working center of the beam) is attached by connection $l$ to a fixed point $m$. By this arrangement the pump plungers $i$ are given a motion within the pump barrels substantially equivalent to that of the beam H opposite the point where connection $l$ is articulated with lever $k$. Any other means of giving motion to these plungers may be employed. For instance there may be an eccentric upon the crank pin itself with an eccentric rod led directly to the plungers. The suctions of the pumps O, O' connect through a suction pipe X, with a tank P carried on a bracket attached to the connecting rod and which is supplied with oil from the tank at bottom of filter M.

Any known means may be used to conduct the oil from the filter M to the tank P, such as a hose, a telescopic joint or a series of swing joints similar to those shown in Fig. 7, or the tank P may be made so long and high that in connection with the pipe entering it, it will make practically a telescopic joint, or a projection on tank P may at each end of stroke open a valve in the discharge pipe $p$ from the filter M, which will be closed by gravity or the force of springs at other times. The discharge pipe $u$ from pump O is to be connected to the oil cavities in the bottom brass $s$ of the crank pin bearing and the discharge pipe $v$ from pump O', is to be connected with oil cavities in the upper bearing brass $s'$ of the crank pin. The pipe $u$ is to pass freely through an opening in the connecting rod cap but be screwed or otherwise secured fluid tight in the brass $s$ itself so that the pressure will be transmitted from the pump through the pipe $u$ to the oil cavities $t$ in the brass. One arrangement of these cavities is shown in Fig. 4, in which the central transverse trunk channel or groove $t'$ cut in the wearing surfaces connects to several longitudinal channels extending nearly but not entirely to the boundaries of the wearing surfaces so that oil introduced at the center through the pipe connection $u$ will be distributed through the channels to the several parts of the wearing surface on the journal. These channels may be of any known arrangement and lie parallel, transverse or diagonal to the motion of the surfaces so long as they are connected together and to the supply pipe.

Instead of running a pipe $u$ through the center of the cap into the bearing brass $s$ as shown, it may be brought in at one or both ends $u'$, $u'$ of the collar of the brass where it overhangs the bearing in the stub end of connecting rod, and connect by a direct or diagonal opening with the central transverse channel $t'$ and through the same and the longitudinal channel $t^2$ to the other channels. Similarly the pipe $v$ from the lower pump O' would either be bifurcated and enter the overhang of the brass at the sides of the main connecting rod or run through an opening in the latter diagonally as shown and screw into the brass on the line of the longitudinal channel, $t^2$. In either case the pipes $u$ and $v$ would respectively pass loosely through the cap and connecting rod but be made fluid tight in the brasses themselves. The relative gross area of the channels $t$, $t'$, $t^2$, compared with that of the bearing surfaces of the brass on the crank pin would be varied according to the amount of pressure under which the oil is introduced.

With the oil at light pressure, the bearing surfaces would be kept large and the channels only of sufficient size to well distribute the oil. If however a sufficient quantity of oil under pressure were used to lift the brass away from the pin, the area of the channels could be increased to reduce the area of the surfaces in contact to a minimum.

The general principle of operation does not require that pumps be used to force the oil into the cavities $t$ of the brasses. So long as the pipes $u$ and $v$ be screwed into the brasses, any oil introduced into them above the level of the crank pin will be "under head" and tend to force itself between the bearing surfaces. This may be illustrated by considering oil continuously poured into the mouth of a funnel at $w$, when the head would be represented by the height of $w$ above the lower surface of the crank pin. Such funnels and pipes separately considered are common in practice but they only act to guide the oil as the ends of the pipes are not screwed into the brasses so as to transmit the head and produce a pressure in the oil cavities. A still greater head would evidently be attained by connecting the pipes $u$ and $v$ with the pipe X, thereby receiving the pressure due to the superior height of the tank P above the crank pin. A thermometer $x$ may be employed to show the temperature of the oil as it comes from the drip pans.

In Fig. 5, L' shows a pump receiving oil from a filter and reservoir M and delivering the same to a series of pipes 5, 10, 11, 28, &c., connecting with the different bearings of an engine and also with an accumulator N', P', to equalize the pressure. The accumulator may consist substantially of a plunger $N^2$ which the oil pressure tends to force out of the cylinder, as shown, but which tendency is resisted by weights or on shipboard by connecting the plunger with the piston rod of a piston in a cylinder $P^2$. This piston should be of larger diameter than plunger $N^2$ and steam be admitted upon it to resist the pressure of the water on the end of the plunger. The pump L' may be either operated from the beam H of the engine as shown or it may be the water end of a steam pump. In operation the full capacity of the pump L' may be discharged into the pipes and find its way out between the brasses and journals. The accumulator may be pushed at times to its extreme limit or the motion of the accumulator piston be employed to regulate the oil pressure. The latter can be accomplished in the arrangement shown by connecting the plunger $N^2$ with a small lever N''' operating a valve $z$ in the suction pipe $y$ of pump L' so that the supply to the latter will be reduced and finally cut off as the accumulator rises. If L' be the pump end of a steam pump, a valve similar to $z$ in the steam pipe could be similarly operated to shut steam off from the steam cylinder as the accumulator rises, thereby regulating the oil pressure. The oil from the system of pipes supplied by pump L' and the accumulator is distributed to the several bearings. The arrangement for stationary bearings is shown applied to the brasses 2 and 3 of a main bearing on shaft E. Preferably the pipes leading to the upper and lower brasses are run separately from a three way cock or valve 4 supplied from the general pressure system through a pipe 5 provided with a stop cock 6. A cross section of the valve 4 is shown in Fig. 6. The arrangement is such that valve 4 will receive such motion from a reciprocating part of the engine as to open the pipe to pressure transmitted through pipe 8 to the top brass 2 when the pressure is on such brass. In the case shown, the motion transmitted is received from beam H through a link 18 provided with a slotted hole which engages with a pin on the operating lever of valve 4 and shifts it alternately one way and the other. As shown the crank has passed the bottom "center" and valve 4 opened to pipe 8 communicating with top brass 2 which is under pressure as the crank rises. The pipes 8 and 7 would be connected to the oil channels in the brasses 2 and 3 in the same way as has been described in reference to Figs. 1, 3 and 4. When it is desired to lubricate a moving bearing on this system, for instance, a crank pin $d$ in Fig. 5, the pressure is transmitted from the pump or accumulator plunger through swinging or telescopic joints. A detail of one form of swinging joint is shown in Fig. 7.

In Fig. 5, pressure is transmitted from the pressure pipe 10 through a pipe connection 11 to a stationary elbow 25. See a transverse central section in Fig. 7. This elbow is provided on the horizontal branch with a stuffing box which receives a pipe 26 provided with a collar 27 arranged to bear in the bottom of the stuffing box and to be held therein by the packing and suitable rings. The line of pipe 26 is in all cases to be parallel to the journals of the parts to which it is to be connected or in this case parallel to main shaft. The outer end of pipe 26 receives an elbow 87 and connects to a swinging pipe 28. The opposite end of pipe 28, Fig. 5, connects through a joint numbered as a whole 29, (similar to that shown in Fig. 7,) to a pipe link 30, connected at the other end through another swing joint, numbered as a whole 31, with a pipe 32 secured to the connecting rod. The pressure from this pipe passes through a regulating cock 33 to a two way cock 34 similar in construction to that shown in Fig. 6 and from this, one branch $v$ leads to the upper brass making a connection similar to that shown in Fig. 1 and the other branch $u$ leads to the lower bearing brass in a similar way. The valve 34 is to be operated in any convenient way from the motion of the engine. As shown, the lever 36 is pivoted in a fulcrum 35 on the cap of the cross head end of connecting rod and one end of the same operates valve 34 through a link 37. An extension at the other end strikes stops 38, 38 near the ends of the stroke and shifts the valve in the same way as has been described in relation to Fig. 6. In this way pressure is brought on the lower brass during the up stroke and on the upper brass during the down stroke. Similarly from the main pressure pipe 32 on connecting rod, pressure is transmitted through a pipe 39 and regulating cock 40 to distributing two way valve 41 from which branch pipes 42 and 43 lead respectively to the lower and upper brasses of the cross head end of connecting rod and the cock 41 is operated through a connection 44 from the lever 36 as shown. Oil may also be transmitted under pressure to the cross head slide brass 45 Fig. 5 by grooving the wearing surface of that brass in a similar manner to that shown in Fig. 4, screwing in the same a supply pipe 86 connecting through distributing valve 47, a stop cock 48, joint 49, pipe connection 50, joint 51, pipe connection 52 and joint 53 to the main supply pipe 32 on connecting rod, whereby the oil under pressure may either be run continuously into the cavities of brass 45 or by the operating handle 46 of cock 47 striking against stationary pieces 54 shut the pressure off a little before the end of the stroke is reached and turn it on again just at the end of the stroke, or by connecting pieces 54, 54 together and giving them a motion by an eccentric restoring the pressure after the crank has fully started on its stroke. The several joints named will permit the various parts to make the motions required in the operation of the engine and at the same time transmit pressure to the several moving bearings. The drawings are only intended to show principles as the details would need to be adapted to each particular case. If the main slide be very long, it may in general be sufficient to supply oil under pressure from a stationary opening at the center of the guide, for instance, at 60 Fig. 5, such pipe being provided with an ordinary cock 61 operated by stops on any moving part 62 of the engine, so proportioned and arranged that the cock 61 will be opened only at the middle and a little on either side of the middle of the stroke of the piston.

Instead of operating the various distributing valves by the motion of the engine piston, the same may be operated by eccentrics connected in various ways familiar in main valve motions, so as to operate such distributing valves and admit oil pressure to the journals at such portions of the stroke as may be found desirable, for instance, to the main journals and crank pins at the time or a little after the piston has commenced its return stroke and to shut the same off considerably before the termination of the stroke, thereby reducing the quantity of oil required to be pumped and making it easier to maintain the pressure with pumps of a given size.

Instead of swinging links 28 and 30 evidently an ordinary telescopic joint could be applied in the general position of 30 though a longer length would be required. In such case only the ends of the telescopic connection would need to swing at 29 and 31.

An apparatus for delivering oil continuously, or nearly so, by means of a pump L' and accumulator N' P', or a combination of pumps to accomplish substantially the same result, is referred to herein as an "oil pressure system" or "apparatus," to distinguish it from that in which oil is forced intermittently into different systems of pipes by single acting pumps like O, O', Fig. 1.

In most cases, it will be sufficient to supply oil under high pressure to the crank pin and main bearings of an engine and under reduced pressure, for instance that produced by raising the supply pipe several inches above the bearings, on the cross head, slides and other moving parts of the engine. In operation it will in general be desirable to adjust the apparatus as a whole so that the bearing carrying the greatest load, usually the crank pin, will be supplied with oil at sufficient pressure to separate the brasses and journal by a thin film of oil so as to practically remove the friction of one metal sliding upon another and substitute therefor the motion on a fluid. This will be accomplished with the arrangement shown in Fig. 1, simply by making the pumps of sufficient strength and capacity to produce the result (as all the oil pumped must escape between the journal and brasses), and with the arrangement shown in Fig. 5 by closing stop cocks 6, 40 and 48 partially and adjusting the accumulator or any regulating apparatus substituted therefor so that the pressure will rise sufficiently high to separate the crank pin and crank pin brasses by a film of escaping oil. In such case the pressure will generally be sufficient to produce the same result on all other brasses, providing the pumps be of sufficient capacity. By putting valves in each branch leading to each side of each bearing, for instance at 55 in crank pin supply pipe $v$ Fig. 5, and at 56 in crank pin supply pipe $u$ and similarly for other bearings, it would be possible to so regulate such cocks that the shifting valve 34 could be omitted. In such case it would be necessary to regulate all the discharge cocks of the system so that the flow through each would be so limited that the pressure would be kept up by the pumping system, although the oil were flowing freely to brasses not under pressure as well as to those under pressure. The distribution to the top and bottom brasses of a number of bearings can also be made through one distributing valve by using throttle valves in each branch pipe leading to each brass in each bearing. For instance, if the pipes $u$ and $v$ distributing oil under pressure to the crank pin bearing be provided near crank pin brasses with regulating cocks 56 and 55 and the pipes 42 and 43 leading oil under pressure to the lower and upper cross head brasses be provided respectively near the brasses with regulating cocks 81 and 82 the regulating cock 41 may be omitted and the distribution be effected to both bearings by one distributing valve 34 by connecting pipe u at or near the point 83 with the pipe 43 at or near the point 84 and the pipe v at or near the point 85 with the pipe 42 at or near the point 86, when by cutting off connection through 39 and 40, pressure distributed by valve 34 to the bottom crank pin brass through u will also be distributed to the top, cross head brass through pipe 43 and oil distributed through distributing valve 34 to the top crank pin brass through pipe v will also be distributed to the lower cross head brass through pipe 42 and by properly regulating the cocks 55, 56, 81 and 82 in the several branches the quantity of oil distributed to the cross head and crank pin brasses can be so adjusted as to keep up the pressure in the former sufficiently to lift the brasses away from the pin and form a film as herein described.

This same system of distribution can be extended to all the other brasses of the engine. For instance, any distributing valve, a stationary one 4, Fig. 5, for example, may have its two branches 8 and 7 connected to the corresponding branches of all other bearings, and pipe 8 may connect through a pipe 11 (then disconnected from 10) and through swinging jointed pipes 28 and 30, pipe 32 and regulating cock 33 to pipe u (then disconnected from valve 34) leading to the bottom crank pin brass and pipe 7 be connected through a duplicate series of pipes like 11, 28 30 and 32 and a duplicate valve like 33 with the pipe v. Evidently this system could be extended to all the bearings.

Still another modification would be, to run the two independent series of pipes, just described as connected to pipes 8 and 7, from a pair of pumps like O, O', Fig. 1, located at any point where the same may be conveniently operated from a moving part of the engine. For instance if the same were located in place of distributing valve 4, when connected as above described, the oil would be intermittently delivered to one series of brasses under strain during one stroke of the engine by one of the pumps and to brasses under strain during the return stroke of the engine by the other pump and the independent pumps and connections would act, in respect to distribution and intermittent delivery to brasses under strain, as the equivalent of a distributing valve 4. It is not necessary however that the pumps O, O', be removed from connecting rod to accomplish this result, as evidently the pumps in that position and operated substantially as described, may not only be used to intermittently supply the oil under pressure to the bearings on the connecting rod itself but through jointed pipes as described also connect to the other bearings of the engine and operate in connection therewith in the same way as if the pumps were placed at 4 as above indicated.

In this specification the word "brass" is used for a journal box independent of the material of which it is constructed. The term "coil N" is used in the general sense to refer to any arrangement of tubes or plates in which the oil on one side of a surface is cooled by a fluid on the other. The term "grooves" is used at times herein to refer to the oil cavities $t$ in the bearing brasses and the phrase "grooved bearing brasses" refers to those provided with such cavities.

The provisions herein described for filtering, cooling and ascertaining the temperature of the oil, are of value independent of the provisions for delivering the same under pressure.

What I claim as my invention, and desire to secure by Letters Patent, is—

1. In combination with bearing brasses provided with oil cavities, and intermittently receiving pressure from a journal in different directions, pipes independently connected fluid-tight with said brasses, pumps, valves and connections for delivering oil under pressure to the cavities in the brasses when such brasses are intermittently strained, substantially as and for the purposes specified.

2. In combination with a journal receiving pressure from different directions and with bearing brasses (provided with oil grooves) operating in connection therewith, oil pressure pumps, pipe connections and valves arranged and operating to transmit oil pressure intermittently to the grooves in the several brasses as each is brought under strain and to release such pressure when the strain is released, substantially as and for the purposes specified.

3. In combination with an oil pressure system for delivering oil under pressure and with the alternately strained bearing brasses of a machine bearing and with a pipe receiving oil under pressure from such oil pressure system and with independent pipes connected fluid tight with such bearing brasses, a distributing valve and mechanical connections to the working parts of the machine for operating such valve, all arranged and operating substantially as and for the purposes specified.

4. In combination with the bearing brasses of a connecting rod or other moving journal of an engine, oil pipes connected with cavities in the brasses of such journal, swinging jointed pipes connecting such oil pipes with an oil pressure system and a distributing valve operated by the motion of the parts to admit oil under pressure to the cavities of the brasses under strain and to shut off such pressure when the strain is released, substantially as and for the purposes specified.

5. In combination: intermittently strained bearing brasses; pumps, valves and connections for circulating oil under pressure intermittently to the several brasses when under strain through independent pipes connected fluid tight with the cavities in such brasses; drip vessels for receiving oil discharged from such cavities; ordinary means for draining the oil from such drip vessels; a filter for removing the impurities from the oil so drained, a tank for receiving the filtered oil, and suction connections from such filtered oil tank to such pressure pumps, all arranged and operating substantially as and for the purposes specified.

6. In combination with bearing brasses, provided with oil cavities and receiving pressure from a journal in different directions, and, in combination with pumps and valves for delivering oil under pressure to the cavities in the brasses when such brasses are under pressure, and in combination with conducting pipes independently connected fluid tight with such brasses, regulating valves in such pipes, arranged and operating substantially as and for the purposes specified.

CHAS. E. EMERY.

Witnesses:
G. C. PENNELL,
N. R. ALLISON.